Patented Feb. 29, 1944

2,343,213

UNITED STATES PATENT OFFICE 2,343,213

PREPARATION OF BARIUM SALTS OF DITHIOPHOSPHORIC ACID ESTERS

Kenneth D. Ashley, Noroton, Conn., assignor to American Cyanamid Company, New York, N. Y., a corporation of Maine No Drawing. Application April 10, 1942, Serial No. 438,435

4 Claims. (Cl. 260—461)

This invention relates to a new and improved method of preparing barium salts of acid esters of dithiophosphoric acids.

It has been recently discovered that the barium salts of dithiophosphoric acid esters, particularly the dialkyl esters of dithiophosphoric acid in which the esterifying groups contain four or more carbon atoms each, are particularly effective when added to hydrocarbon lubricating oils in the prevention of sludge formation in the oil, varnish formation on the pistons and other metallic parts of the engine and as corrosion inhibitors, preventing corrosion of copper-lead, silver-cadmium, nickel-cadmium and other alloy bearings commonly employed in internal combustion engines.

Barium salts of the dithiophosphoric acid esters are known compounds, but so far as I am aware have been prepared only by the neutralization of an acid ester of a dithiophosphoric acid with barium oxide or barium hydroxide. Although the preparation of these barium salts is conveniently carried out with either barium oxide or barium hydroxide, the use of the oxide or hydroxide presents a number of serious disadvantages. Chemically, the reaction involves the formation of one mole of water, which requires removal from the product before it can be added to a lubricating oil as a corrosion inhibitor and sludge dispersant. Economically, barium oxide and hydroxide are relatively expensive chemicals and, at the present time, not available in sufficient quantities to prepare the barium salt of esters of dithiophosphoric acids in commercial quantities.

The high cost of barium oxide and barium hydroxide is based in part upon the difficulty of preparing the compounds from available raw materials. Commercial methods of preparation involve igniting native sulfate or heavy spar with coal, or charcoal, whereby an impure barium sulfide is obtained. This is converted into barium carbonate by heating in a current of moist carbon dioxide. Super-heated steam is then passed over the heated carbonate, resulting in the formation of Ba(OH)₂ and CO₂. BaO may be prepared by heating witherite (BaCO₃) in admixture with coal to 1100 to 1200° C. in a reducing atmosphere. Unfortunately, however, witherite is not available at a reasonable cost, and it is necessary to start with barytes (BaSO₄) and prepare the barium hydroxide as outlined above.

I have now discovered that the barium salts of esters of dithiophosphoric acid may be prepared in good yield and of satisfactory purity suitable for use in the preparation of heavy duty, anti-sludging, anti-corrosion, lubricating oils by the use of barium sulfide as will hereinafter be described. The reaction whereby the barium salts of the esters of dithiophosphoric acids are prepared, in accordance with my invention, is as follows:

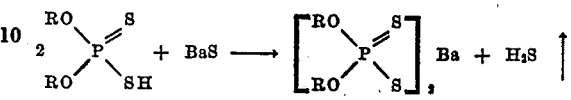

R in the above formula, being an aliphatic, aromatic or cycloaliphatic radical.

The reaction is carried out by adding finely ground BaS to a selected dithiophosphoric acid ester dissolved in a suitable solvent such as alcohol, mineral spirits or the like. The neutralization reaction is exothermic and the finely ground BaS is preferably added gradually with cooling of the reaction mixture. Alternatively, the acid esters may be added to a slurry of finely ground BaS if desired. In the event that the reaction is slow to start, gentle warming of the reaction mixture may be advisable. As will be noted from the reaction equation, H₂S is given off during the reaction, and provision should be made to take care of this gas. Evolution of H₂S may serve as an indication of the course of the reaction and when the gas is no longer being evolved or when the product is neutral to litmus paper, the reaction may be considered complete. The product is then filtered to remove excess BaS and contaminating salts, which may have been added therewith. The product is then ready for immediate use as a lubricating oil additive or if the solvent contained water, as when using 95% alcohol, the solvent and water may be removed by evaporating in vacuo.

Although I may use chemically pure barium sulfide, it is not necessary to do so. For economic reasons, I prefer to use a crude barium sulfide product, known in the trade as black ash. This crude product is prepared by reducing barium sulfate with coal, the following method having been found suitable: A sample of the mineral barytes was crushed in a jaw crusher and stage-crushed on rolls to pass a 30-mesh screen. A sample of low ash anthracite coal was also crushed and passed through a 30-mesh screen. 100 parts of barytes and 19 parts of coal were then mixed and passed through a rotary kiln heated to a temperature of 1100° C. The crude product was found to contain 78% water-soluble BaS or acid-soluble material equivalent to about 90% BaS. The insoluble materials other than BaS are for the most part inert and are removed from the barium salt of the dithiophosphoric acid ester by filtration at the completion of the neutralization reaction.

As previously stated, I prefer to employ the dialkyl dithiophosphoric acids in preparing the barium salts for use as lubricating oil additives principally because of their greater oil solubility. For the same reason, I prefer that the alkyl groups contain at least four carbon atoms each. Examples of such dithiophosphoric acids which may be employed include: dipropyl dithiophosphate, dibutyl dithiophosphate, diamyl dithiophosphate, di-n-octyl dithiophosphate, diethylhexyl dithiophosphate, dilauryl dithiophosphate, dioctadecyl dithiophosphate, dicapryl dithiophosphate and the like. Dithiophosphates such as dicyclohexyl dithiophosphate and diphenyl dithiophosphate may also be employed if desired. The preparation of a typical barium salt of a dialkyl dithiophosphate will now be illustrated by the following example, which is given, however, by way of example, since my invention in its broader aspects is to be limited only by the scope of the appended claims.

100 parts by weight of dilauryl dithiophosphate was dissolved in 25 parts by weight of 95% ethyl alcohol and 60 parts by weight of mineral spirits. 22 parts by weight of finely ground crude BaS (black ash) was added to the solution gradually with stirring, meanwhile cooling the reaction mixture to keep it below 40-45° C. After about 20 minutes, evolution of $H_2S$ had substantially ceased, and the product was neutral to litmus paper. The resulting dark-colored product was mixed with 60 parts by weight of mineral spirits and filtered. Excess solvent was then evaporated in vacuo from the product at a temperature of the order of 85-100° C. When the evaporation was about two-thirds completed, 10-W grade lubricating oil was added to bring the final product to a content of 50% by weight of barium dilauryl dithiophosphate and the evaporation then completed. The product thus described is eminently satisfactory for blending directly with lubricating oils at concentrations of 0.1 to 3.0% by weight based on the content of barium dilauryl dithiophosphate present.

I claim:

1. A method of preparing the barium salt of esters of dithiophosphoric acid which comprises mixing an acid ester of dithiophosphoric acid with amounts of barium sulfide sufficient to substantially neutralize the said acid ester and allowing the reaction to proceed until the evolution of $H_2S$ has ceased and the barium salt of the acid ester of dithiophosphoric acid has been formed.

2. A method of preparing the barium salt of dialkyl esters of dithiophosphoric acid with amounts of barium sulfide sufficient to substantially neutralize the said dialkyl ester and allowing the reaction to proceed until the evolution of $H_2S$ has substantially ceased and the barium salt of dialkyl ester of dithiophosphoric acid has been formed.

3. A method of preparing the barium salt of dilauryl dithiophosphoric acid which comprises mixing dilauryl dithiophosphoric acid with amounts of barium sulfide sufficient to substantially neutralize the said dilauryl dithiophosphoric acid and allowing the reaction to proceed until the evolution of $H_2S$ has substantially ceased and barium dilauryl dithiophosphate has been formed.

4. A method in accordance with claim 1 in which the reaction is carried out with the dithiophosphoric ester dissolved in a substantially non-aqueous solvent.

KENNETH D. ASHLEY.